April 7, 1936.  G. H. ROBERTS  2,036,721
PISTON RING
Filed May 12, 1934
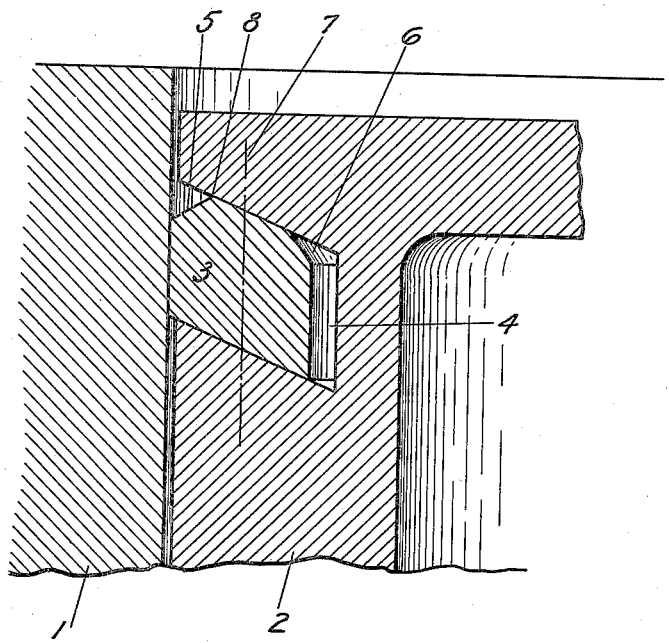
G. H. ROBERTS   INVENTOR.
BY Merrill M. Blackburn
ATTORNEY Patented Apr. 7, 1936

2,036,721

UNITED STATES PATENT OFFICE 2,036,721

PISTON RING

George H. Roberts, Rock Island, Ill.

Application May 12, 1934, Serial No. 725,324

8 Claims. (Cl. 309—25)

The present invention relates to improvements in piston rings and more particularly improvements in compression rings. It has been found that when a large portion of the upper surface of a compression ring is exposed to the heat generated by the combustion of the explosive mixture there is an undue lineal expansion of the ring, resulting oftentimes in the ring getting so large as to bind in the cylinder and create excessive unit-area pressures against the cylinder wall. A certain amount of chamfer or bevel at the upper outer corner of the ring appears to be essential for successful operation. This furnishes a surface against which the pressure caused by the combustion of the explosive mixture may act. This pressure reduces the unit-area pressure against the cylinder wall but, when the surface exposed to the fire is not made too great, the ring is not unduly expanded, lineally, by the heat. Furthermore, when the ring is made to fit the adjacent ring-groove surfaces rather closely, the hot combustion gases have less chance to engage the full upper surface of the ring and the gases do not, to any great extent, get between the ring and the piston wall so as to increase materially the unit-area pressure of the ring against the cylinder. There are also various other advantages resulting from the present construction.

Among the objects of this invention are to provide a piston ring which will show a decreased wear per mile of travel over rings as heretofore constructed; to provide a ring of the character indicated in which the wear of the ring and piston, where their surfaces contact, will be reduced to a minimum; and such further objects, advantages and capabilities as will hereafter appear and as are inherent in the construction disclosed herein.

The single figure of the drawing shows a fragmentary vertical section of a piston and cylinder block, together with a cross section of a ring embodying my present invention.

In the annexed drawing, I have indicated the cylinder wall by the numeral 1, the piston by the numeral 2, and my improved piston ring by the numeral 3. Of course it will be understood that these parts are much magnified in order to make the disclosure as clear as possible. I have provided the piston ring groove 4 with upper and lower inclined walls which are parallel and inclined inwardly and downwardly away from the piston head. The inner and outer faces of the ring are parallel to the axis of the piston and, naturally, make other than a right angle with the inclined upper and lower faces of the ring. The two upper corners of the ring are beveled or chamfered, as indicated at 5 and 6. The line 7 supposedly passes midway between the inner and outer faces of the ring and is parallel thereto, that is, this line represents the longitudinal axis of a section of one side of the ring.

The upper and lower contact faces of the ring are frusto-conical and the angle 8, between the upper contact face and the chamfered face 5, is preferably approximately mid-way between the line 7 and the outer periphery of the piston, though this angle may be anywhere between the line 7 and said outer periphery. Naturally, the amount of chamfer must vary with the dimensions and strength of the ring but the best results will be secured somewhere in the vicinity of what is disclosed in the drawing. The width of the upper contact face of the ring, between the two bevels, should be at least one-half of the transverse width of the ring and should be less than one hundred per cent (100%) thereof. Preferably, the upper contact face of the ring should be approximately sixty per cent (60%) of the ring width, though here, again, this relationship will be dependent to a certain extent upon the dimensions and strength of the ring.

It will of course be understood that the specific description of structure set forth above may be departed from without departing from the spirit of this invention.

I claim:

1. A piston assembly comprising a piston having a compression ring groove extending inwardly from the cylindrical surface of the piston and inclining away from the surface of the piston against which the explosive force acts, in combination with a compression ring having upper and lower frusto-conical contact faces contacting the corresponding faces of the ring groove, the upper contacting face of the ring being at least one-half as wide as the transverse thickness of the ring and less than the full thickness thereof.

2. A structure as defined by claim 1 in which the outer limit of the upper contacting face of the ring is inside of the outer periphery of the piston.

3. A structure as defined by claim 1 in which the outer limit of the upper contacting face of the ring is inside of the outer periphery of the piston and outside of the longitudinal axis of a section of one side of the ring.

4. A piston assembly comprising a piston having a compression ring groove extending inwardly from the cylindrical surface of the piston and inclining away from the surface of the piston against which the explosive force acts, in combination with a compression ring, said ring having upper and lower groove-wall-contacting faces, substantially parallel and so inclined as to contact and conform to the groove walls, the contacting face of the upper surface being not less than fifty per cent (50%) of the transverse thickness of the ring and less than the full thickness thereof.

5. A piston assembly comprising a piston having a compression ring groove extending inwardly from the cylindrical surface of the piston and inclining away from the surface of the piston against which the explosive force acts, in combination with a compression ring having upper and lower frusto-conical contact faces inclining in the same direction as the inclined faces of the groove, the upper outer angle of the ring being chamfered so as to form an exposed surface inclining in the opposite direction from the upper contact surface, the angle between the chamfered surface and the upper contact surface being located approximately midway between the outer periphery of the piston with which the ring is used and the longitudinal axis of a section of one side of the ring.

6. A piston assembly comprising a piston having a compression ring groove extending inwardly from the cylindrical surface of the piston and inclining away from the surface of the piston against which the explosive force acts, in combination with a compression ring having upper and lower frusto-conical contact faces inclining in the same direction as the inclined faces of the groove, the upper outer angle of the ring being chamfered so as to form an exposed surface inclining in the opposite direction from the upper contact surface, the angle between the chamfered surface and the upper contact surface being located approximately midway between the outer periphery of the piston with which the ring is used and the longitudinal axis of a section of one side of the ring, the upper inclined contact surface of the ring being approximately one-half of the ring thickness.

7. A piston assembly comprising a piston having a compression ring groove extending inwardly from the cylindrical surface of the piston and inclining away from the surface of the piston against which the explosive force acts, in combination with a compression ring having upper and lower frusto-conical contact faces inclined in the same direction as the inclined faces of the groove, the upper outer angle of the ring being chamfered so as to form an exposed surface inclining in the opposite direction from the upper contact surface, the angle between the chamfered surface and the upper contact surface being located approximately midway between the outer periphery of the piston with which the ring is used and the longitudinal axis of a section of one side of the ring, the chamfered surface being out of parallelism with all other surfaces of the ring.

8. A piston assembly comprising a piston having a compression ring groove extending inwardly from the cylindrical surface of the piston and inclining away from the surface of the piston against which the explosive force acts, in combination with a compression ring having upper and lower frusto-conical contact faces inclining in the same direction as the inclined faces of the groove, the upper outer angle of the ring being chamfered so as to form an exposed surface inclining in the opposite direction from the upper contact surface, the angle between the chamfered surface and the upper contact surface being located approximately midway between the outer periphery of the piston with which the ring is used and the longitudinal axis of a section of one side of the ring, the chamfered surface inclining away from the axis of the ring and being out of parallelism with all other surfaces of the ring.

GEORGE H. ROBERTS.